March 12, 1968  A. B. CUTTING ET AL  3,373,375
KLYSTRON OSCILLATOR UTILIZING BOTH FORWARD AND
BACKWARD WAVE INTERACTION
Filed March 30, 1966

INVENTORS
Alan Butler Cutting
George Campbell Morrow
BY Smith, Michael,
Bradford & Gardiner

ATTORNEY 3,373,375
KLYSTRON OSCILLATOR UTILIZING BOTH FORWARD AND BACKWARD WAVE INTERACTION
Alan B. Cutting and George C. Morrow, both of London, England (% Century Works, Lewisham, London, SE. 13, England)
Filed Mar. 30, 1966, Ser. No. 538,659
Claims priority, application Great Britain, Mar. 31, 1965, 13,566/65
9 Claims. (Cl. 331—83)

ABSTRACT OF THE DISCLOSURE

In an extended interaction klystron oscillator an electron beam sets up a standing wave in a slow wave structure, the slow wave structure being such that the standing wave set up therein interacts with the electron beam only at locations where antinodes occur.

---

Figure 1:
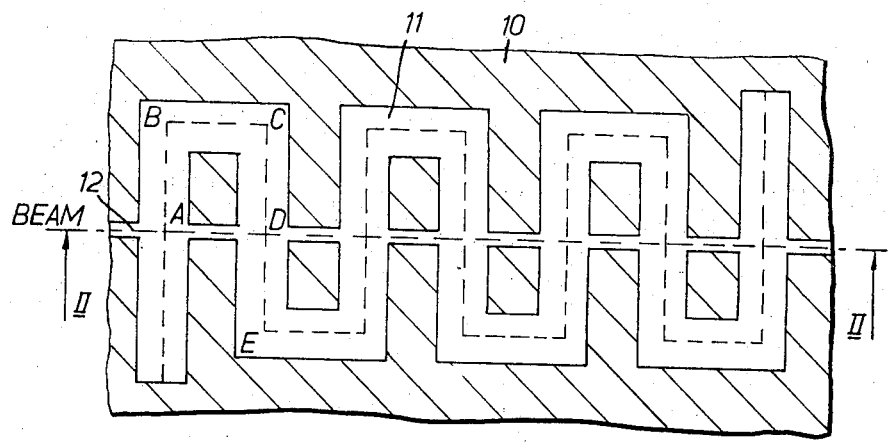

This invention relates to klystrons and more particularly to extended interaction klystron oscillators.

In an extended (or distributed) interaction klystron oscillator, an electron beam reacts with the electrical field in a length of a slow wave structure. In a slow wave structure the velocity of propagation of electrical fields (microwave radiation) is lower than the velocity of light. Furthermore, the structure is electrically short-circuited at each end so that a standing wave field pattern is produced at resonant frequencies of the structure.

According to one aspect of the invention, there is provided a klystron oscillator, comprising a slow wave structure having such a form that the phase velocity of the forward component of a standing wave field therein is equal to the phase velocity of the first space harmonic of the backward component of the standing wave field, whereby both the forward and the backward components of the field can interact in substantially the same manner with an electron beam passing through the structure.

According to another aspect of the invention, there is provided an extended interaction klystron oscillator, including means defining a longitudinally sinuous wave guide cavity comprising a plurality of parallel side-by-side slots and a plurality of interconnecting portions, one end of each slot being connected to an end of the next slot on one side by a said interconnecting portion and the other end of each slot being connected to an end of the next slot on the other side by a further interconnecting portion, each slot having an electrical length substantially equal to the length of a plurality of half wave lengths of a desired resonant frequency and each interconnecting portion having an electrical length equal to the length of a small fraction of a half wave length of the said desired resonant frequency, the oscillator also including means defining a substantially straight line passage intersecting the wave guide cavity substantially at the centres of the said slots and means for electrically short-circuiting the said cavity at each end for setting up a standing wave field in the said cavity whose forward and backward components have substantially the same phase velocity whereby an electron beam in the said passage interacts in substantially the the same manner with both the forward and backward components of the standing wave field in the cavity.

An oscillator embodying the invention preferably includes radiation prevention means for substantially preventing the said structure from radiating energy outwardly.

Such radiation prevention means may advantageously comprise means for defining a wave guide cavity surrounding the said structure and tightly coupled to the structure, the size of this wave guide cavity being such that energy radiated outwardly by the structure is reflected back to the structure by the wave guide cavity.

Figure 2:
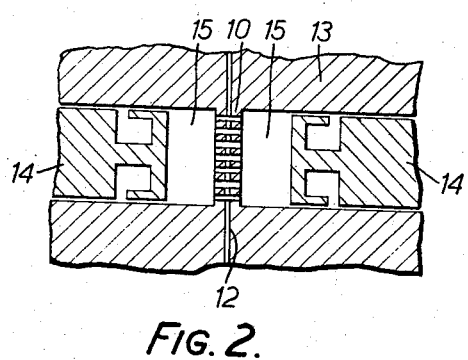

An extended interaction klystron oscillator embodying the invention will now be described, by way of example, and with reference to the accompanying diagrammatic drawing in which:

FIGURE 1 is a longitudinal section through an interdigital slow wave structure, in the oscillator; and
FIGURE 2 is a longitudinal section to a reduced scale on the line II—II of FIG. 1.

The oscillator (FIG. 1) includes a body 10 comprising an interdigital slow wave structure defining a generally sinuous open sided cavity 11 and a passage 12 for an electron beam, the passage extending along the axis of the cavity 11 and intersecting the cavity at a plurality of spaced interaction gaps. The passage 12 is evacuated and connected to a source of electrons as in other klystron oscillators.

The pitch AD of the cavity 11 has a length which is a small fraction of a wave length of the required frequency of the oscillator so that the phase velocity of the electric field along the axis of the cavity 11 is much less than the velocity of light. The distance ABCD has a length equal to a multiple of a half wave length of the required frequency of the oscillator; therefore because the distance AD is very small compared with the distance ABCD, it will be apparent that the distance CE is only a little less than the distance ABCD and is substantially equal to a multiple of a half wave length of the desired frequency. Hence the structure is built up of a series of approximately half wave length slots. The cavity 11 is electrically shorted at each end. Considering the extreme left hand slot in FIGURE 1, the distance from A to the shorted end of the slot and back to A is equal to the distance ABCD; the extreme right hand slot in FIGURE 1 is similar. Therefore a standing wave field is set up by an electron beam traversing the passage 13, the forward component and the backward component of the wave both assisting in providing a peak amplitude of the standing wave field at the centre of each slot, that is, at each gap where the passage 12 intersects the cavity 11.

In operation, an electron beam passes down the passage 12 and interacts with the standing wave field at each gap where the passage intersects the cavity 11. Adjacent gaps are separated from each other by a drift space or region in which the electron beam is substantially free of interaction with the electric field. Because the slow wave structure is so dimensioned that the forward component of the standing wave field and the backward component combine to provide a peak amplitude of the standing wave at each intersection of the cavity by the passage 12, both the forward and the backward components of the field interact with the electron beam in an assisting sense so as to maintain the standing wave with the greatest efficiency.

Because of the length CE of the slots relative to the resonant frequency of the slow wave structure, the slots will radiate energy outwardly, in a direction perpendicular to the sectional plane of FIG. 1. This radiation of energy will reduce the stored energy and the Q value of the resonant structure as a whole. The body 10 defining the cavity 11 and the passage 12 is therefore positioned within a wave guide 13 (FIG. 2) having adjustable choke portions 14 so as to define wave guide cavities 15 on each side of the slow wave structure. The chokes 14 can be positioned with respect to the structure so as to reflect a particular harmonic of the standing wave by arranging the distance between the chokes and the slow wave structure to be approximately a corresponding multiple of a quarter of a wave length of the fundamental resonant frequency of the structure. Then it will be apparent that the energy of the particular harmonic radiated by the structure is reflected back and confined within the cavities 15 and so alters the resonant frequency of the structure to one corresponding to the particular harmonics. The wave guide 13 and the adjustable chokes 14 therefore not only serve to prevent outward radiation of energy from the slow wave structure, but also enables the operating frequency of the oscillator to be tuned mechanically, so that an electromagnetic field is set up in the slow wave structure having a desired frequency of oscillation.

The output from the oscillator can be taken by any method well known in the art such as by allowing the electromagnetic wave in the cavity to escape, or by means responsive to the electromagnetic field in the cavity 11 or waveguide 15.

What is claimed is:

1. An extended interaction klystron oscillator for operating at any one of a plurality of harmonically related predetermined frequencies, comprising
   a slow wave structure defining a longitudinally sinuous cavity and further defining an electron beam passage which intersects the said cavity at regularly spaced gaps,
   means providing reflective terminations for the cavity,
   means for directing an electron beam along the said passage, to induce a standing wave field of one said predetermined frequency in the said cavity which interacts with the said electron beam at the said gaps, the said cavity being so dimensioned and terminated that the said standing wave field has an antinode substantially coincident with each said gap.

2. An oscillator according to claim 1, including radiation prevention means for substantially preventing the said structure from radiating energy outwardly.

3. An oscillator according to claim 2, in which the said radiation prevention means comprises means defining a wave guide cavity surrounding the said structure and tightly coupled to the structure, the size of this wave guide cavity being so related to the predetermined frequency of the said standing wave field that the energy radiated outwardly by the said slow wave structure is reflected back to the structure in an assisting sense by the said wave guide cavity.

4. An oscillator according to claim 3, in which the said wave guide cavity is defined at least in part by at least one choke portion which is adjustable to vary the size of the said wave guide cavity whereby to adjust the said predetermined frequency of the standing wave fluid.

5. In an extended interaction klystron oscillator for operating at any one of a plurality of harmonically related predetermined frequencies,
   means defining a longitudinally sinuous wave guide cavity comprising a plurality of parallel side-by-side slots and a plurality of interconnecting portions, one end of each slot being connected to an end of the next slot on one side by a said interconnecting portion and the other end of each slot being connected to an end of the next slot on the other side by a further interconnecting portion, each slot having an electrical length substantially equal to the length of an integral number of half wavelengths of a said predetermined frequency and each interconnecting portion having an electrical length equal to the length of a small fraction of a half wavelength of a said predetermined frequency, the oscillator also including
   means defining a substantially straight line electron beam passage intersecting the wave guide cavities substantially at the centres of the said slots,
   means providing a short-circuited reflective termination for each of the two end slots of the cavity at such distances from the points of intersection of the said passage and cavity as to support an electromagnetic standing wave of a said predetermined frequency in said cavity having peak amplitudes substantially at the said points of intersection, and
   means for passing an electron beam along the said passage to induce said standing wave in said cavity which is maintained by the interaction between said beam and said wave.

6. An oscillator according to claim 5, including radiation prevention means for substantially preventing the said structure from radiating energy outwardly.

7. An oscillator according to claim 6, in which the said radiation prevention means comprises means defining a wave guide cavity surrounding the said structure and tightly coupled to the structure, the size of this wave guide cavity being so related to the predetermined frequency of the said standing wave field that the energy radiated outwardly by the said slow wave structure is reflected back to the structure by the said wave guide cavity.

8. An oscillator according to claim 7, in which the said wave guide cavity is defined at least in part by at least one choke portion which is adjustable to vary the size of the said wave guide cavity whereby to adjust the said predetermined frequency of the standing wave field.

9. An oscillator according to claim 1, wherein said slow wave structure comprises
   means defining an interdigital waveguide.

References Cited

UNITED STATES PATENTS

| | | | |
|---|---|---|---|
| 2,672,571 | 3/1954 | Harman | 331—82 |
| 2,899,595 | 8/1959 | Winkler | 315—39.3 X |

OTHER REFERENCES

Hutter et al., "Traveling-Wave Tubes," Radio-Electronic Engineering, April 1954, pp. 23–25, 71.

ROY LAKE, *Primary Examiner.*

S. H. GRIMM, *Assistant Examiner.*